(12) United States Patent
De Wind (10) Patent No.: US 10,538,201 B2
(45) Date of Patent: Jan. 21, 2020

(54) INTERIOR PRISMATIC MIRROR WITH INTEGRAL TOGGLE (71) Applicant: MAGNA MIRRORS OF AMERICA, INC., Holland, MI (US)

(72) Inventor: Darryl P. De Wind, West Olive, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 290 days.

(21) Appl. No.: 15/203,839

(22) Filed: Jul. 7, 2016

(65) Prior Publication Data

US 2017/0008457 A1  Jan. 12, 2017

Related U.S. Application Data (60) Provisional application No. 62/189,944, filed on Jul. 8, 2015.

(51) Int. Cl.
*B60R 1/08* (2006.01)
(52) U.S. Cl.
CPC .................................. *B60R 1/086* (2013.01)
(58) Field of Classification Search
CPC ............. B60R 1/08; B60R 1/04; B60R 1/086
See application file for complete search history.

(56) References Cited

U.S. PATENT DOCUMENTS

| 3,472,580 | A | * | 10/1969 | Janosky | B60R 1/086 |
| | | | | | 359/606 |
| 3,522,987 | A | * | 8/1970 | Pflaum | B60R 1/086 |
| | | | | | 359/606 |
| 3,870,404 | A | | 3/1975 | Wilson et al. | |
| 4,319,806 | A | | 3/1982 | Brandenburg | |
| 4,359,264 | A | | 11/1982 | Ziegler et al. | |
| 4,435,042 | A | | 3/1984 | Wood et al. | |
| 4,436,371 | A | | 3/1984 | Wood et al. | |
| 4,524,941 | A | | 6/1985 | Wood et al. | |
| 4,646,210 | A | | 2/1987 | Skogler et al. | |
| 4,679,906 | A | | 7/1987 | Brandenburg | |
| 4,807,096 | A | | 2/1989 | Skogler et al. | |
| 4,822,140 | A | | 4/1989 | Mittelhauser | |
| 4,826,289 | A | | 5/1989 | Vandenbrink et al. | |
| 4,836,648 | A | * | 6/1989 | Niwayama | B60R 1/086 |
| | | | | | 359/606 |
| 4,882,565 | A | | 11/1989 | Gallmeyer | |
| 4,936,533 | A | | 6/1990 | Adams et al. | |
| 5,100,095 | A | | 3/1992 | Haan et al. | |

(Continued)

*Primary Examiner* — Jennifer D. Carruth
(74) *Attorney, Agent, or Firm* — Honigman LLP (57) ABSTRACT

An interior rearview mirror assembly for a vehicle includes a mirror casing and a prismatic reflective element, with the mirror casing adjustably supported at a mirror mount at an interior surface of the vehicle. The mirror casing includes a principal mirror casing portion and a pivotable mirror casing portion that is pivotable relative to the principal mirror casing portion. A toggle assembly includes a toggle lever and a spring element disposed between and coupled to the toggle lever and the pivotable mirror casing portion of the mirror casing. Pivotal movement of the toggle lever flexes the spring element and adjusts the angle of the principal mirror casing portion and the prismatic reflective element relative to the pivotable mirror casing portion of the mirror casing.

20 Claims, 6 Drawing Sheets

(56) References Cited

U.S. PATENT DOCUMENTS

| | | | |
|---|---|---|---|
| 5,327,288 A * | 7/1994 | Wellington | B60R 1/086 248/479 |
| 5,521,760 A | 5/1996 | De Young et al. | |
| 5,555,136 A | 9/1996 | Waldmann et al. | |
| 5,576,687 A | 11/1996 | Blank et al. | |
| 5,582,383 A | 12/1996 | Mertens et al. | |
| 5,673,994 A | 10/1997 | Fant, Jr. et al. | |
| 5,680,263 A | 10/1997 | Zimmermann et al. | |
| 5,798,688 A | 8/1998 | Schofield | |
| 5,820,097 A | 10/1998 | Spooner | |
| 5,984,482 A | 11/1999 | Rumsey et al. | |
| 6,227,675 B1 * | 5/2001 | Mertens | B60R 1/086 248/477 |
| 6,229,319 B1 | 5/2001 | Johnson | |
| 6,315,421 B1 | 11/2001 | Apfelbeck et al. | |
| 6,318,870 B1 * | 11/2001 | Spooner | B60R 1/086 248/477 |
| 6,329,925 B1 | 12/2001 | Skiver et al. | |
| 6,439,755 B1 | 8/2002 | Fant, Jr. et al. | |
| 6,483,438 B2 | 11/2002 | DeLine et al. | |
| 6,501,387 B2 | 12/2002 | Skiver et al. | |
| 6,540,193 B1 | 4/2003 | DeLine | |
| 6,593,565 B2 | 7/2003 | Heslin et al. | |
| 6,690,268 B2 | 2/2004 | Schofield et al. | |
| 6,877,709 B2 | 4/2005 | March et al. | |
| 7,184,190 B2 | 2/2007 | McCabe et al. | |
| 7,249,860 B2 * | 7/2007 | Kulas | B60R 1/04 359/604 |
| 7,255,451 B2 | 8/2007 | McCabe et al. | |
| 7,274,501 B2 | 9/2007 | McCabe et al. | |
| 7,289,037 B2 | 10/2007 | Uken et al. | |
| 7,338,177 B2 | 3/2008 | Lynam | |
| 7,360,932 B2 | 4/2008 | Uken et al. | |
| 7,420,756 B2 | 9/2008 | Lynam | |
| 7,626,749 B2 | 12/2009 | Baur et al. | |
| 8,049,640 B2 | 11/2011 | Uken et al. | |
| 8,277,059 B2 | 10/2012 | McCabe et al. | |
| 8,508,831 B2 | 8/2013 | De Wind et al. | |
| 8,529,108 B2 | 9/2013 | Uken et al. | |
| 8,730,553 B2 | 5/2014 | De Wind et al. | |
| 9,346,403 B2 | 5/2016 | Uken et al. | |
| 9,598,019 B2 | 3/2017 | Blank et al. | |
| 2010/0085653 A1 * | 4/2010 | Uken | B60R 1/04 359/872 |
| 2015/0097955 A1 * | 4/2015 | De Wind | B60R 1/062 359/872 |

* cited by examiner

FIG. 5

INTERIOR PRISMATIC MIRROR WITH INTEGRAL TOGGLE

CROSS REFERENCE TO RELATED APPLICATION

The present application claims the filing benefits of U.S. provisional application Ser. No. 62/189,944, filed Jul. 8, 2015, which is hereby incorporated herein by reference in its entirety.

FIELD OF THE INVENTION

The present invention relates generally to the field of interior rearview mirror assemblies for vehicles, and more particularly to interior prismatic mirror assemblies.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element. It is also generally known to provide an interior mirror assembly with a prismatic reflective element that may be manually toggled between daytime and nighttime reflectivity positions. An example of such is described in U.S. Pat. No. 6,318,870, which is hereby incorporated herein by reference in its entirety.

SUMMARY OF THE INVENTION

The present invention provides an interior rearview mirror assembly that includes a prismatic reflecting element and a mirror casing integrally formed with portions of a toggle assembly that adjusts the viewing angle of the prismatic reflecting element. The toggle assembly includes a toggle lever integrally formed with a lower edge or portion of the mirror casing, whereby a living hinge is formed between the toggle lever and the mirror casing. A spring element (such as a metallic spring element or a plastic or polymeric spring element) is disposed between the toggle lever and a movable rear section of the mirror casing, whereby pivoting the toggle lever about the living hinge adjusts the angle of the prismatic reflective element relative to the movable rear section. A mounting feature is provided at the movable rear section of the mirror casing and is configured to adjustably mount at an interior surface of the vehicle.

Optionally, the movable rear section of the mirror casing comprises a rear panel or portion of the mirror casing that has an upper pivot portion and three free edges (opposite side edges and a lower edge). The movable section of the mirror casing may pivot relative to the prismatic reflective element by resiliently flexing proximate an upper edge of the mirror casing. Also, the metal spring is coupled with the toggle lever (such as, for example, via insert molding), such that the pivoting motion of the toggle lever is spring biased about the living hinge. Accordingly, the toggle lever may be spring biased to a first position that positions the prismatic reflective element at a direct reflection viewing angle and movable to a second position that positions the prismatic reflective element at an offset reflection viewing angle, which reduces glare and brightness of light reflected to the driver's eyes.

These and other objects, advantages, purposes and features of the present invention will become apparent upon review of the following specification in conjunction with the drawings.

DESCRIPTION OF THE PREFERRED EMBODIMENTS

Figure 1:
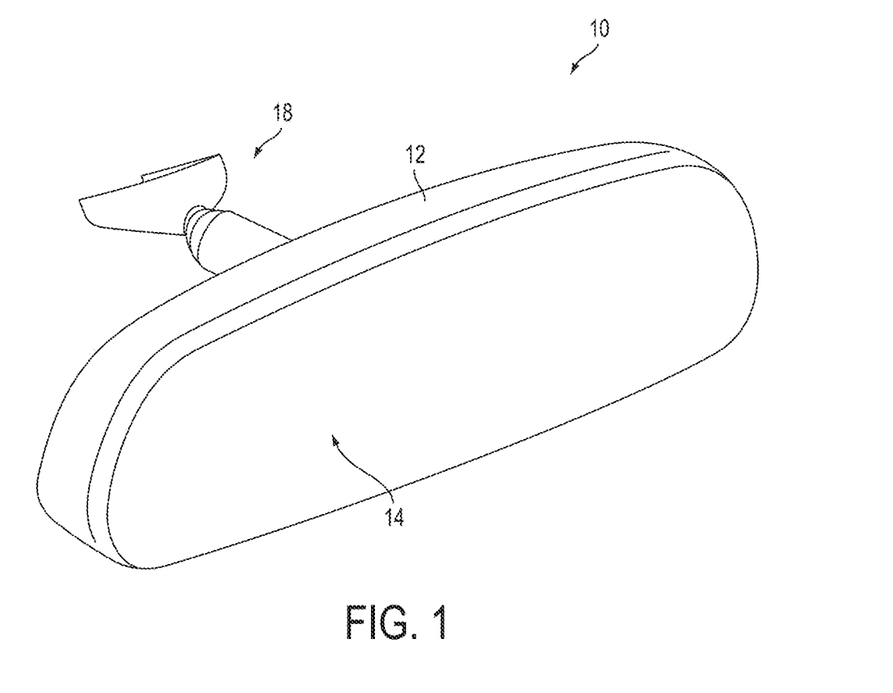
FIG. 1 is a front perspective view of an interior rearview mirror assembly, in accordance with the present invention.

Referring now to the drawings and the illustrative embodiments depicted therein, an interior rearview mirror assembly 10 for a vehicle includes a casing 12 and a prismatic mirror reflective element 14 positioned at a front portion of the casing 12 (FIG. 1). The mirror casing 12 is integrally formed with portions of a toggle assembly 16 (FIGS. 2-5), such as via injection molding, for providing a prismatic mirror assembly with fewer parts and lighter weight. The toggle assembly 16 is provided to adjust the viewing angle of the prismatic reflecting element 14 between reflective angles configured for daytime and nighttime driving conditions, because when the reflector surface of the mirror reflective element is at an offset viewing angle, this effectively reduces reflected brightness and glare during nighttime driving conditions. The mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 18.

Figure 2:
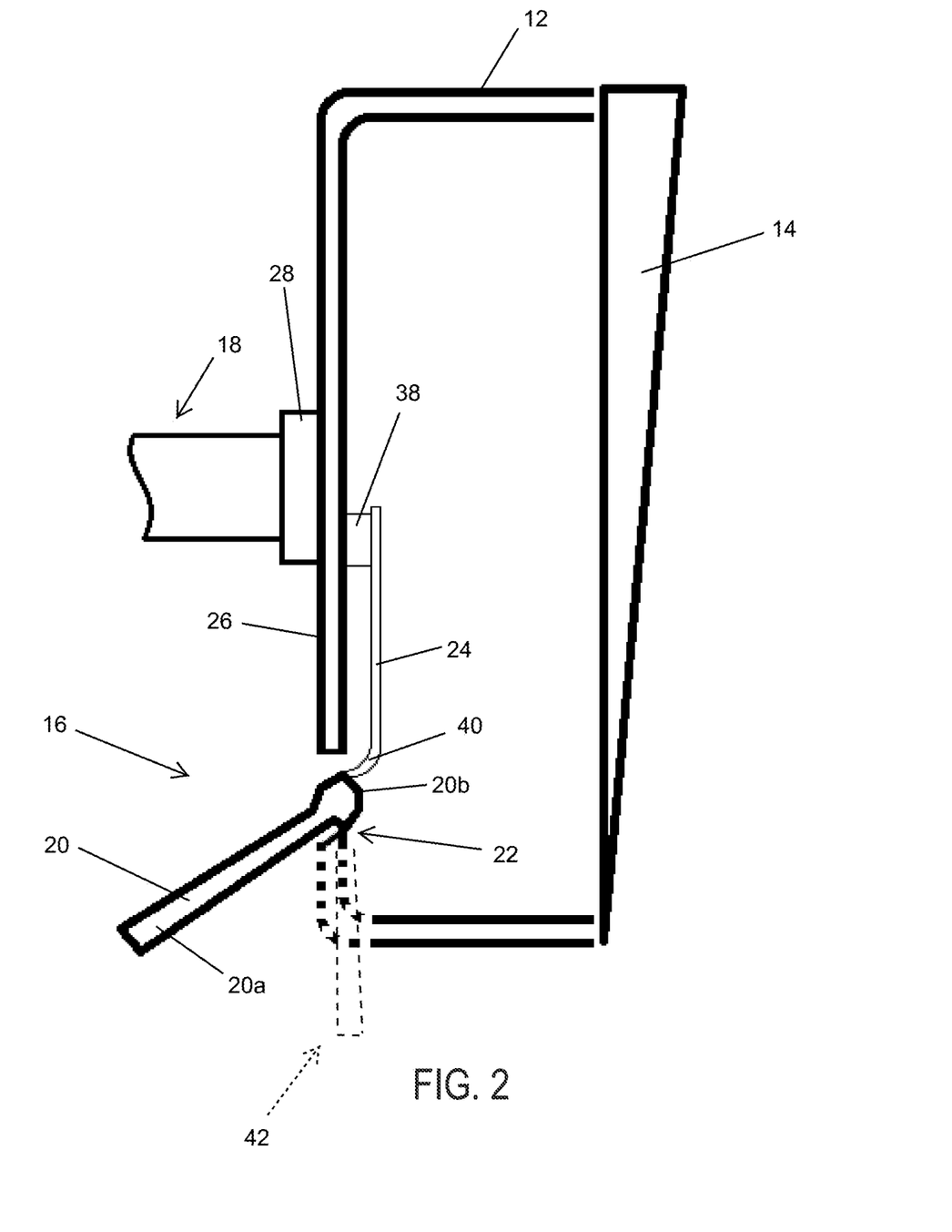
FIG. 2 is a schematic sectional view of an interior rearview mirror assembly, in accordance with the present invention.
Figure 3:
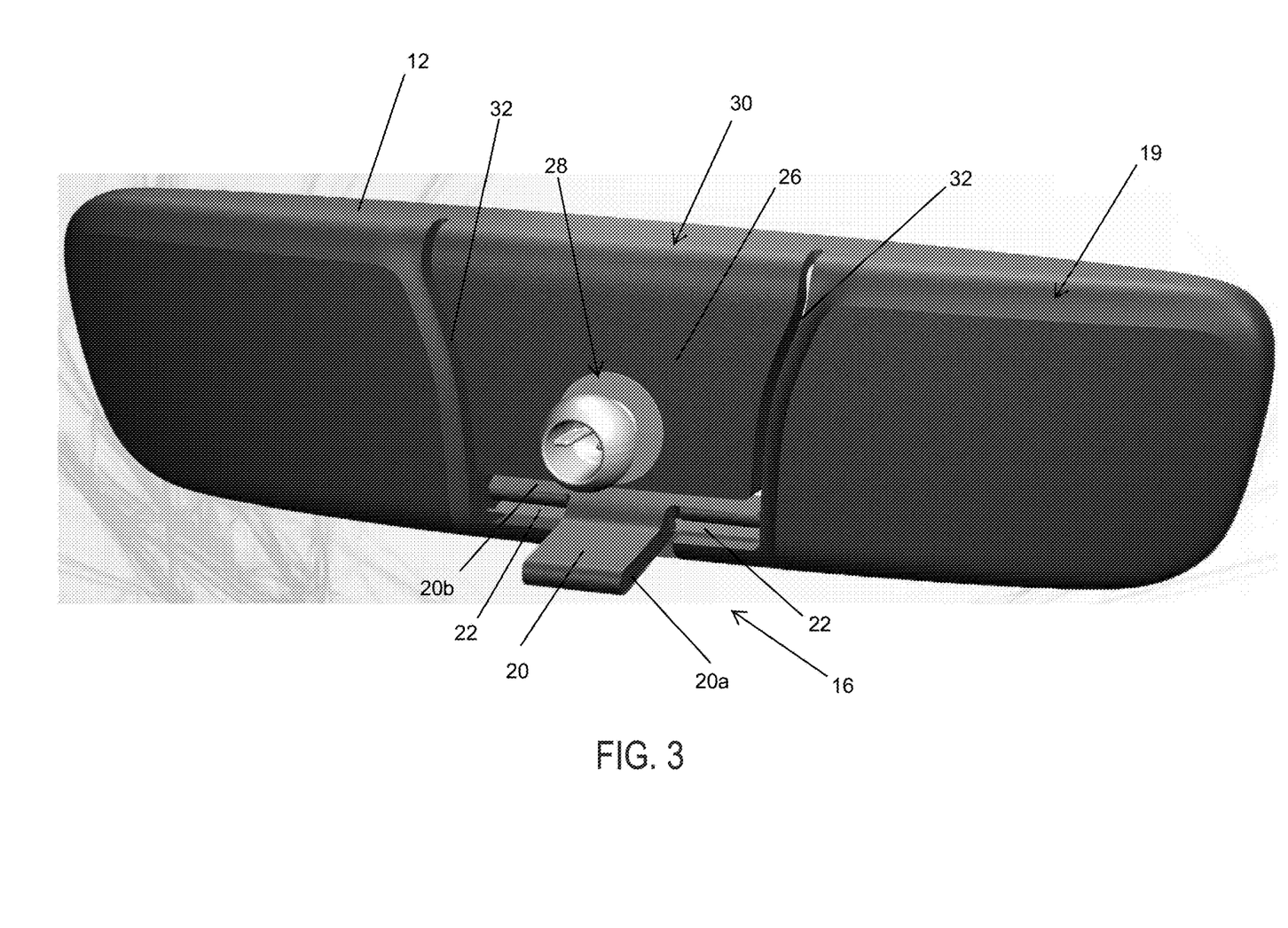
FIG. 3 is a rear perspective view of an interior rearview mirror assembly, in accordance with the present invention.

In the illustrated embodiment, and such as shown in FIGS. 2 and 3, the mirror casing 12 has a principal casing portion 19 and a flexible rear panel or movable rear portion 26 that flexes and moves or pivots relative to the principal casing portion 19. The toggle assembly 16 includes a toggle lever 20 integrally formed with a lower portion or edge of the mirror casing 12 (and integral with the principal casing portion 19), whereby a living hinge 22 is formed between the toggle lever 20 and the lower edge of the mirror casing 12. A spring element 24, such as a metal spring, is disposed between and coupled with the toggle lever 20 and the movable rear portion 26 of the mirror casing 12, whereby pivoting the toggle lever 20 about the living hinge 22 adjusts the angle of the lower portion and principal casing portion 19 of the mirror casing 12 and prismatic reflective element 14 relative to the movable rear portion 26.

A pivot element or mounting feature 28 (such as a ball member (FIGS. 3-5) or socket (FIGS. 2A-2D) or other pivot element) is disposed at the movable rear portion 26 of the mirror casing 14 and is configured to adjustably mount at an interior surface of the vehicle via the mounting assembly 18, so as to allow for adjustment of the rearward field of view of the driver of the vehicle. Adjustment of the toggle lever 20 imparts angular movement of the prismatic reflective element 14 relative to the mirror casing 12 and results in different viewing angles and different degrees of reflectance of the prismatic reflective element 14 as viewed by the driver of the vehicle. As shown in FIGS. 2A-2D, the pivot element 28 may be integrally formed, such as via injection molding, with the movable rear portion 26 of the mirror casing 18.

Figure 2A:
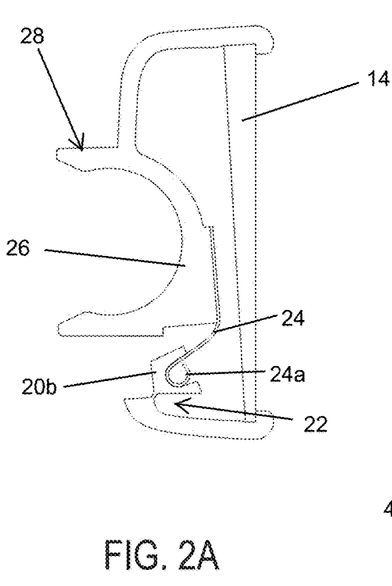
FIG. 2A is a schematic sectional view taken along a plane that illustrates a living hinge for a toggle lever of an interior rearview mirror assembly having a socket integrally formed therewith, in accordance with the present invention.

The toggle lever 20 of the toggle assembly is integrally formed, such as via injection molding, below the movable rear portion 26 of the mirror casing 12, proximate a lower portion or edge of the mirror casing 12. As shown in FIGS. 2 and 2A, the living hinge 22 is formed between the toggle lever 20 and the lower edge of the mirror casing 12. The toggle lever 20 includes an upper portion 20b and a lower portion 20a at opposing upper and lower sides of the living hinge, thereby allowing the living hinge to act as a fulcrum of the toggle lever 20. The lower portion 20a protrudes downward and/or rearward from the mirror casing 12 to define a tab that is manually operable to move and pivot the toggle lever 20 about the living hinge 22. The upper portion 20b of the toggle lever 20 comprises a generally elongated member having a substantially cylindrical shape that spans laterally, as shown in FIG. 3, beyond the width of the tab shape of the lower portion 20a of the toggle lever 20.

As shown in FIG. 3, the living hinge 22 may be formed between the lateral sections of the upper portion 20b of the toggle lever 20 and the mirror casing 12. The upper portion 20b of the toggle lever 20 is attached to the metal spring 24, which in turn is attached to the movable rear panel or portion 26 of the mirror casing, whereby the spring 24, responsive to manual pivoting of the toggle lever 20, pivots the lower edge and the principal casing portion 19 of the mirror casing 12 (to which the prismatic reflective element is fixedly attached) relative to the movable rear portion 26 of the mirror casing 12. To provide such attachment, the metal spring 24 may be insert molded or otherwise attached (such as via adhesive, fasteners, or the like) to the upper portion 20b of the toggle lever 20. Optionally, the toggle lever 20 may be otherwise configured and/or attached at the metal spring 24. Optionally, the spring element and/or the toggle tab may attach (such as via a snap attachment) at the outside of the mirror casing. Optionally, the spring element may comprise a plastic or polymeric spring element that may be integrally formed with the toggle lever and/or with the movable portion of the mirror casing.

The movable rear section or portion 26 of the mirror casing 12 comprises three free edges or sides that are formed by three openings or channels or slots that extend through the rear wall of the mirror casing and an integrally connected side proximate an upper edge 30 of the mirror casing 12 (such that the rear portion 26 is pivotally connected or joined or formed at the principal casing portion 19 via only the upper edge 30). More specifically, two lateral channels or slots 32 (FIG. 3) may be formed in the mirror casing that extend upward from the toggle lever on opposing sides of the mounting feature 28, beyond the rear wall, to an upper surface or edge 30 of the mirror casing 12. Also, a lower channel or slot 34 (FIG. 4) may be formed in the mirror casing that extends generally horizontally to interconnect the bottom ends of the two lateral channels 32, thereby dividing and separating the toggle lever and the principal mirror casing portion from the movable rear portion 26. The movable rear portion 26 of the mirror casing is pivotable or movable about the upper edge 30 of the mirror casing 12, such that the movable portion 26 may pivot about a generally horizontal pivot axis relative to the principal mirror casing portion and the prismatic reflective element by resiliently flexing the mirror casing or casing wall proximate and between the top ends of the two lateral channels 32 or the upper edge 30 of the mirror casing 12, without any living hinge arrangement at the upper edge 30 of the mirror casing (although optionally, the mirror casing may be formed with a thinner section or region at the upper edge 30 to enhance pivoting of the rear portion 26 relative to the principal portion 19).

Optionally, in order to limit or substantially prevent visible bulging or deformation along the upper edge 30 of the mirror casing 12 due to the movable portion 26 pivoting rearward, away from the reflective element 14, the upper edge 30 proximate the movable portion 26 may be molded to have a narrower profile or perceived thickness than the upper edge 30 of the mirror casing 12 on opposing lateral sides of the movable portion 26. Optionally, the movable portion 26 may be alternatively shaped with respect to the mirror casing 12, such as with alternatively angling or shaping the lateral channels and/or lower channel, or otherwise providing more or fewer channels or openings to encompass at least three sides of the mounting feature 28, which generally forms the movable portion 26.

Figure 4:
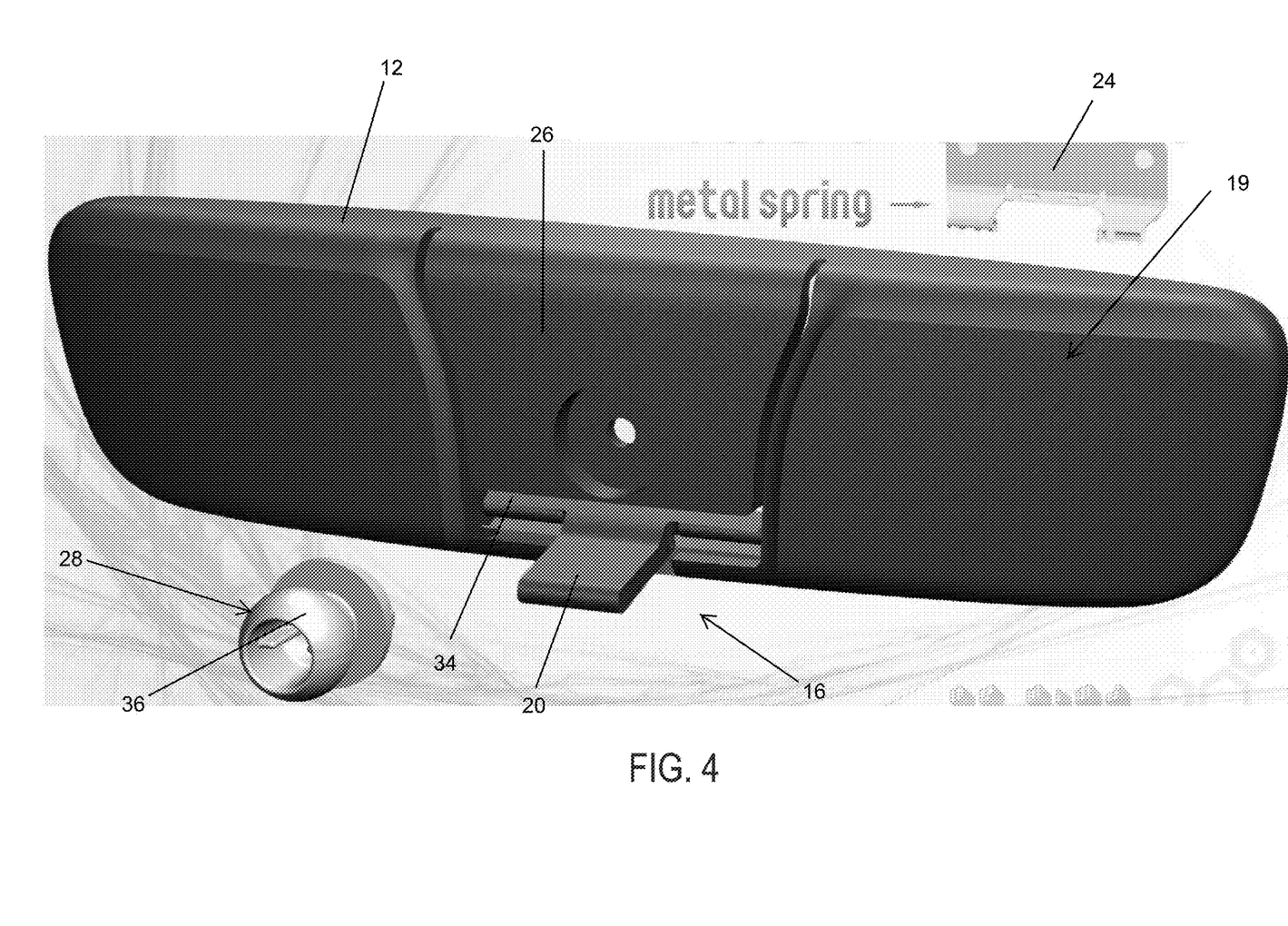
FIG. 4 is an exploded rear perspective view of the interior rearview mirror assembly of FIG. 3.

In the illustrated embodiment shown in FIG. 4, the pivot element or mounting feature 28 comprises a ball member that is configured to be pivotally received in a socket of a mounting structure or arm. As such, the pivot element or mounting feature 28 is configured to be adjustably mounted to a socket of a mounting structure at an interior portion of the vehicle. In addition to portions of the toggle assembly integrally formed with the mirror casing 12, the pivot element or mounting feature 28 or portions thereof may also be integrally formed with the movable portion 26 of the mirror casing 12 or insert molded with the mirror casing.

With respect to providing a biasing or preload force to the toggle lever 20, the spring element 24, such as a flat metal spring, may be coupled between the toggle lever and the movable portion 26 of the mirror casing 12. More specifically, a lower end of the spring element 24 is coupled with the upper portion 20b of the toggle lever 20, as described above, and an upper end of the spring element is attached to a connection feature 38 (FIGS. 2 and 5) of the movable portion 26, on the interior side of the rear wall. The connection feature 38 may be a protrusion that engages an opening in the spring element 24 or may be a snap attachment element or fastener or adhesive or the like that otherwise secures the spring element 24 to the movable portion 26 of the mirror casing 12.

Figure 2B:
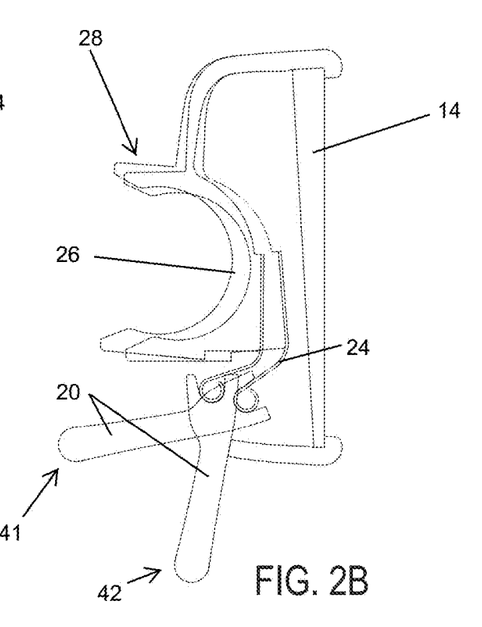
FIG. 2B is a schematic sectional view of the interior rearview mirror assembly shown in FIG. 2A, taken along a plane that illustrates the toggle lever in both a daytime reflecting position and a nighttime reflecting position.
Figure 2C:
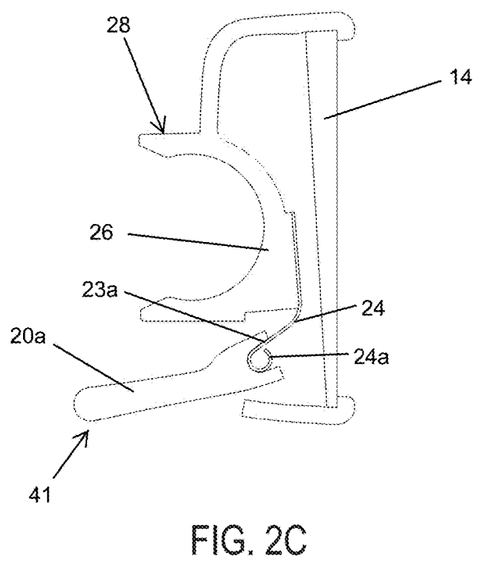
FIG. 2C is a schematic sectional view of the interior rearview mirror assembly shown in FIG. 2B, illustrating the daytime reflecting position.
Figure 2D:
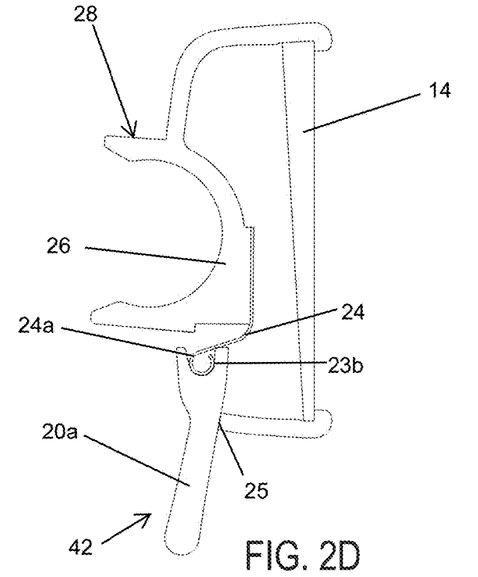
FIG. 2D is a schematic sectional view of the interior rearview mirror assembly shown in FIG. 2B, illustrating the nighttime reflecting position.
Figure 5:
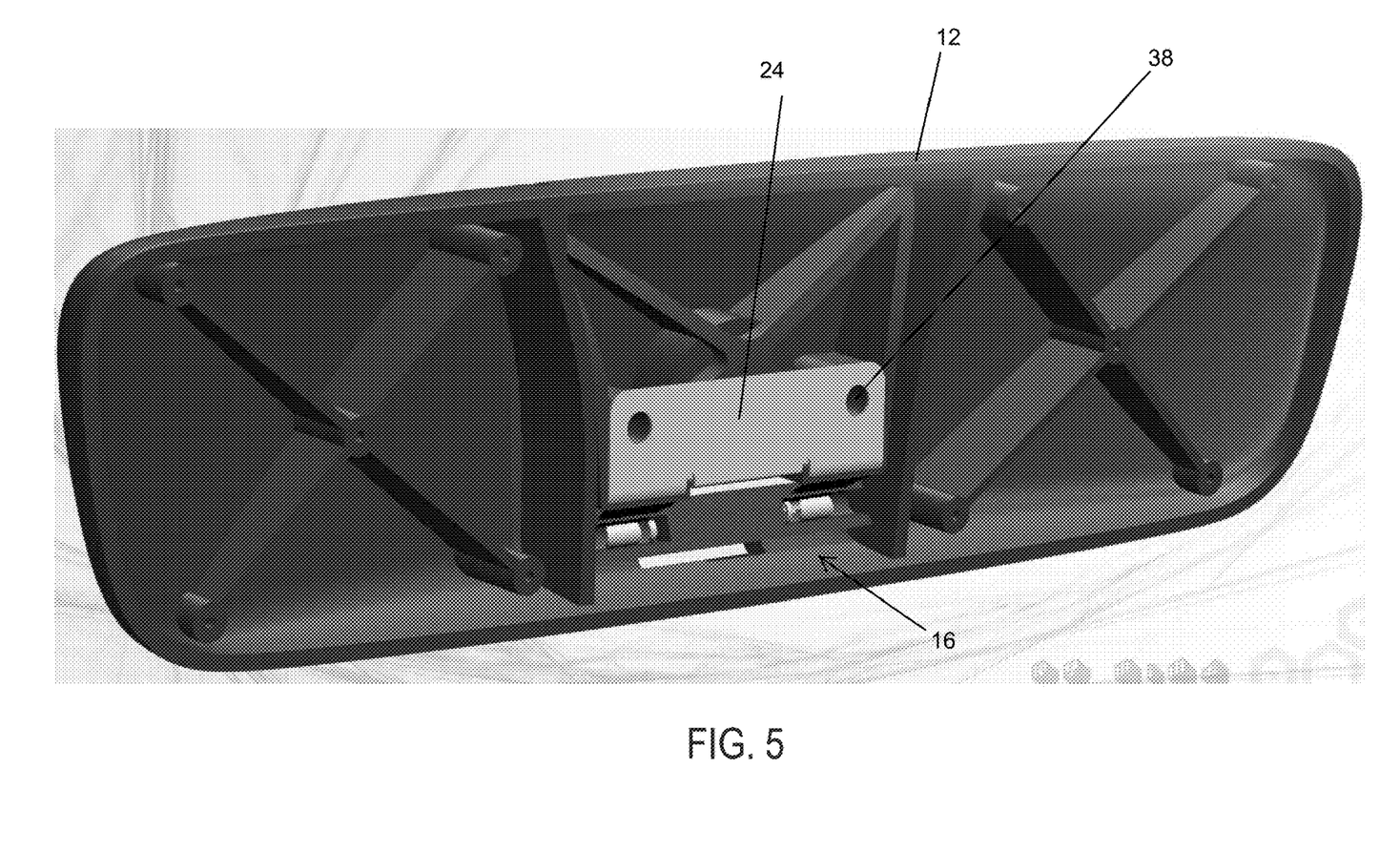
FIG. 5 is a front perspective view of a mirror casing of FIG. 3 having a prismatic reflective element removed to show a toggle assembly, in accordance with the present invention.

As can be seen in FIG. 2, the spring element 24 may include a pre-bend curvature 40 that resiliently flexes upon pivoting the toggle lever 20 from a home position, such as for a daytime or non-glare reflecting position (FIGS. 2 and 2C), downward to an actuated or angled position 42, such as for a nighttime or glare reflecting position (FIGS. 2 and 2D). As illustrated in FIGS. 2A-2D, the spring element 24 may include a rounded end 24a that attaches to the upper portion 20b of the toggle lever 20. The rounded end 24a may engage or be received in a similarly rounded depression in the end of the toggle lever 20, which, as shown in FIGS. 2B-2C, allows the rounded end 24a to rotate in the rounded depression. The upper edges of the rounded depression thereby form a stop feature or surface to limit or substantially prevent further pivoting of the toggle lever 20. More specifically, as shown in the illustrated embodiment of FIG. 2C, the rearward upper edge 23a of the rounded depression abuts the rearward surface of the spring element and thereby prevents the spring element 24 from pivoting the lower portion 20a of the toggle lever any further upward. Similarly, as shown in FIG. 2D, the forward upper edge 23b of the rounded depression abuts the forward surface of the spring element 24 and thereby limits the lower portion 20a of the toggle lever from rotation any further downward. Each position may also include a stop feature or surface on the mirror casing 12 to prevent pivotal movement of the toggle lever 20 beyond the respective angle. As also shown in FIG. 2D, the lower portion of the mirror casing includes a limiting surface 25 that abuts the toggle lever 20 and prevents further downward pivoting of the toggle lever 20. As shown in FIGS. 3-5, a cam surface/arrangement is similarly established between the lower end of the spring element 24 and the upper portion 20b of the toggle lever 20 to retain the toggle lever and the reflective element at the selected position.

In the home or daytime reflecting position 41 (FIG. 2C), the toggle lever 20 and movable portion 26 of the mirror casing 12 positions the mirror reflector surface of the prismatic reflective element 14 at a direct reflection viewing angle, which is intended to reflect more light toward the driver. In the actuated or angled or nighttime or glare reflecting position 42 (FIG. 2D), the toggle lever 20 and movable portion 26 of the mirror casing 12 positions the mirror reflector surface of the prismatic reflective element 14 at an offset reflection viewing angle, which provides a reduced glare and brightness of light reflected toward the driver's eyes, relative to the direct reflection viewing angle. As shown in FIG. 2B, the respective positions of the movable portion 26 of the mirror casing 12 are illustrated in the daytime reflecting position 41 and the actuated or angled or nighttime or glare reflecting position 42. The angular movement of the movable portion 26 is configured with the reflecting element 14 to provide the desired glare and brightness reduction for the driver's viewing angle in the actuated or angled or nighttime or glare reflecting position 42.

As shown in FIG. 5, the interior rear wall of the mirror casing 12 includes a plurality of reinforcement ribs with coring at the rib intersections that are integrally formed with the mirror casing 12 to increase the stiffness of the mirror casing 12. The movable portion 26 of the mirror housing 12 is separated with interior vertical walls and includes a network of reinforcement ribs, which function to strengthen both the attachment points or connection features 28 for the spring element 24 and the pivot element or mounting feature 28. Optionally, the mirror casing 12 may be reinforced with more, fewer or other reinforcement ribs, gussets, or other structural features to provide the necessary structural support for supporting and operating the reflective element and any other features of the mirror assembly.

Optionally, the mirror casing may include a bezel portion that circumscribes a perimeter region of the front surface of the reflective element and that attaches the reflective element at the perimeter of the principal mirror casing portion. Optionally, the perimeter region of the front surface of the reflective element may be exposed (such as by utilizing aspects of the mirror reflective elements described in International Publication Nos. WO 2010/124064; WO 2011/044312; WO 2012/051500; WO 2013/071070 and/or WO 2013/126719, which are hereby incorporated herein by reference in their entireties), whereby the mirror reflective element may be adhered or otherwise attached at a structure of the principal mirror casing portion.

The reflective element and mirror casing are adjustable relative to a base portion or mounting assembly to adjust the driver's rearward field of view when the mirror assembly is normally mounted at or in the vehicle. The mounting assembly may comprise a single-ball or single-pivot mounting assembly, whereby the reflective element and casing are adjustable relative to the vehicle windshield (or other interior portion of the vehicle) about a single pivot joint, or the mounting assembly may comprise other types of mounting configurations, such as a double-ball or double-pivot mounting configuration or the like, while remaining within the spirit and scope of the present invention. The socket or pivot element is configured to receive a ball member of the base portion, such as for a single pivot or single ball mounting structure or a double pivot or double ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, which are hereby incorporated herein by reference in their entireties).

The mounting base includes an attaching portion that is configured to be attached to an interior surface of a vehicle windshield (such as to a mounting button or attachment element adhered to the interior surface of the vehicle windshield or such as to a headliner or overhead console of the vehicle). The mounting base may comprise a metallic ball portion or may comprise a molded (such as injection molded) polymeric mounting base or may be otherwise formed, depending on the particular application of the mirror assembly.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Des. Pat. Nos. D633,423; D633,019; D638,761 and/or D647,017, and/or International Publication Nos. WO 2010/124064; WO 2011/044312; WO 2012/051500; WO 2013/071070 and/or WO 2013/126719, which are hereby incorporated herein by reference in their entireties.

Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319 and/or 6,315,421 (which are hereby incorporated herein by reference in their entireties), that can benefit from the present invention.

Optionally, the interior rearview mirror assembly may include circuitry therein (such as at a printed circuit board or the like disposed within the mirror casing, and electrical connection to the circuitry may be made via an electrical lead or connector of a wiring harness of the vehicle. Optionally, the electrical connector may be received through the mirror casing and through an aperture established through the toggle element, such as by utilizing aspects of the mirror assemblies described in U.S. Pat. No. 5,798,688 and/or U.S. Publication No. US-2010-0085653, which are hereby incorporated herein by reference in their entireties.

The mirror assembly may comprise or utilize aspects of other types of casings or the like, such as described in U.S. Pat. Nos. 7,338,177; 7,289,037; 7,249,860; 6,439,755; 4,826,289 and/or 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501 and/or 7,184,190, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. An interior rearview mirror assembly for a vehicle, said interior rearview mirror assembly comprising:
 a mirror casing, wherein said mirror casing comprises a principal mirror casing portion and a pivotable mirror casing portion that is pivotable relative to said principal mirror casing portion;
 a prismatic reflective element disposed at said principal mirror casing portion of said mirror casing;
 wherein said pivotable mirror casing portion of said mirror casing is adjustably supported at a mirror mount configured for mounting at an interior portion of a vehicle equipped with said interior rearview mirror assembly;
 a toggle assembly comprising (i) a spring element coupled to said pivotable mirror casing portion and (ii) a toggle lever pivotally disposed at a lower portion of said principal mirror casing portion and coupled to said spring element; and
 wherein pivotal movement of said toggle lever about a pivot axis at said lower portion of said principal mirror casing portion flexes said spring element and adjusts an angle of said principal mirror casing portion and said prismatic reflective element relative to said pivotable mirror casing portion of said mirror casing.

2. The interior rearview mirror assembly of claim 1, wherein said pivotable mirror casing portion of said mirror casing includes free sides and an integrally connected side proximate an upper region of said principal mirror casing portion of said mirror casing.

3. The interior rearview mirror assembly of claim 2, wherein said free sides of said pivotable mirror casing portion of said mirror casing are separated from said principal mirror casing portion.

4. The interior rearview mirror assembly of claim 3, wherein the free sides of said pivotable mirror casing portion of said mirror casing are separated from said principal mirror casing portion by slots established between said pivotable mirror casing portion and said principal mirror casing portion.

5. The interior rearview mirror assembly of claim 1, wherein an upper region of said pivotable mirror casing portion is joined to said principal mirror casing portion.

6. The interior rearview mirror assembly of claim 1, wherein said pivotable mirror casing portion of said mirror casing comprises a pivot element that adjustably attaches at said mirror mount.

7. The interior rearview mirror assembly of claim 6, wherein said pivot element comprises a socket element that pivotally receives a ball member of said mirror mount.

8. The interior rearview mirror assembly of claim 1, wherein said pivotable mirror casing portion of said mirror casing pivots relative to said principal mirror casing portion and said prismatic reflective element by resiliently flexing proximate an upper region of said mirror casing.

9. The interior rearview mirror assembly of claim 1, wherein said toggle lever is integrally formed with a lower portion of said principal mirror casing portion and has a living hinge formed therebetween.

10. The interior rearview mirror assembly of claim 9, wherein said toggle lever includes an upper portion and a lower portion, and wherein said lower portion is exterior said mirror casing and comprises a tab for manually moving said toggle lever about said living hinge, and wherein said upper portion of said toggle lever is coupled to said spring element.

11. The interior rearview mirror assembly of claim 10, wherein said spring element comprises a metal spring insert molded with said toggle lever.

12. The interior rearview mirror assembly of claim 1, wherein said spring element comprises a metal spring insert molded with said pivotable mirror casing portion.

13. The interior rearview mirror assembly of claim 1, wherein said spring element biases said toggle lever toward a first position that positions said prismatic reflective element at a daytime viewing angle, and wherein said toggle lever is pivotable to a second position that positions said prismatic reflective element at a nighttime viewing angle.

14. The interior rearview mirror assembly of claim 13, wherein, with said toggle lever pivoted to said second position, said spring element biases said toggle lever towards said second position.

15. An interior rearview mirror assembly for a vehicle, said interior rearview mirror assembly comprising:
 a mirror casing, wherein said mirror casing comprises a principal mirror casing portion and a pivotable mirror casing portion that is pivotable relative to said principal mirror casing portion;
 a prismatic reflective element disposed at said principal mirror casing portion of said mirror casing;
 wherein said pivotable mirror casing portion of said mirror casing is adjustably supported at a mirror mount configured for mounting at an interior portion of a vehicle equipped with said interior rearview mirror assembly;

wherein said pivotable mirror casing portion of said mirror casing comprises a pivot element that adjustably attaches at said mirror mount;

a toggle assembly comprising (i) a spring element coupled to said pivotable mirror casing portion and (ii) a toggle lever pivotally disposed at a lower portion of said principal mirror casing portion and coupled to said spring element;

wherein pivotal movement of said toggle lever about a pivot axis at said lower portion of said principal mirror casing portion flexes said spring element and adjusts an angle of said principal mirror casing portion and said prismatic reflective element relative to said pivotable mirror casing portion of said mirror casing; and wherein, when said toggle lever is pivotally moved about said pivot axis, said pivotable mirror casing portion pivots relative to said principal mirror casing portion and said prismatic reflective element by resiliently flexing proximate an upper region of said pivotable mirror casing portion.

16. The interior rearview mirror assembly of claim 15, wherein said toggle lever is integrally formed with a lower portion of said principal mirror casing portion and has a living hinge formed therebetween.

17. The interior rearview mirror assembly of claim 16, wherein said toggle lever includes an upper portion and a lower portion, and wherein said lower portion is exterior said mirror casing and comprises a tab for manually moving said toggle lever about said living hinge, and wherein said upper portion of said toggle lever is coupled to said spring element.

18. The interior rearview mirror assembly of claim 15, wherein said spring element comprises a metal spring insert molded with said toggle lever.

19. An interior rearview mirror assembly for a vehicle, said interior rearview mirror assembly comprising:

a mirror casing, wherein said mirror casing comprises a principal mirror casing portion and a pivotable mirror casing portion that is pivotable relative to said principal mirror casing portion;

wherein an upper region of said pivotable mirror casing portion is joined to said principal mirror casing portion and wherein said pivotable mirror casing portion pivots relative to said principal mirror casing portion by resiliently flexing said upper region of said pivotable mirror casing portion;

a prismatic reflective element disposed at said principal mirror casing portion of said mirror casing;

wherein said pivotable mirror casing portion of said mirror casing is adjustably supported at a mirror mount configured for mounting at an interior portion of a vehicle equipped with said interior rearview mirror assembly;

wherein said pivotable mirror casing portion of said mirror casing comprises a pivot element that adjustably attaches at said mirror mount;

a toggle assembly comprising (i) a spring element coupled to said pivotable mirror casing portion and (ii) a toggle lever pivotally disposed at a lower portion of said principal mirror casing portion and coupled to said spring element;

wherein said toggle lever is integrally formed with a lower portion of said principal mirror casing portion and has a living hinge formed therebetween, said living hinge having a pivot axis;

wherein pivotal movement of said toggle lever about said pivot axis at said lower portion of said principal mirror casing portion flexes said spring element and adjusts an angle of said principal mirror casing portion and said prismatic reflective element relative to said pivotable mirror casing portion of said mirror casing;

wherein, when said toggle lever is pivotally moved about said pivot axis, said pivotable mirror casing portion pivots relative to said principal mirror casing portion and said prismatic reflective element by resiliently flexing proximate an upper region of said pivotable mirror casing portion; and wherein said spring element biases said toggle lever toward a first position that positions said prismatic reflective element at a daytime viewing angle, and wherein said toggle lever is pivotally moved about said pivot axis to a second position that positions said prismatic reflective element at a nighttime viewing angle.

20. The interior rearview mirror assembly of claim 19, wherein said toggle lever includes an upper portion and a lower portion, and wherein said lower portion is exterior said mirror casing and comprises a tab for manually moving said toggle lever about said living hinge, and wherein said upper portion of said toggle lever is coupled to said spring element.

* * * * *